J. EATON.
MOTOR CONTROL SYSTEM.
APPLICATION FILED JUNE 13, 1912.
1,045,959.
Patented Dec. 3, 1912.
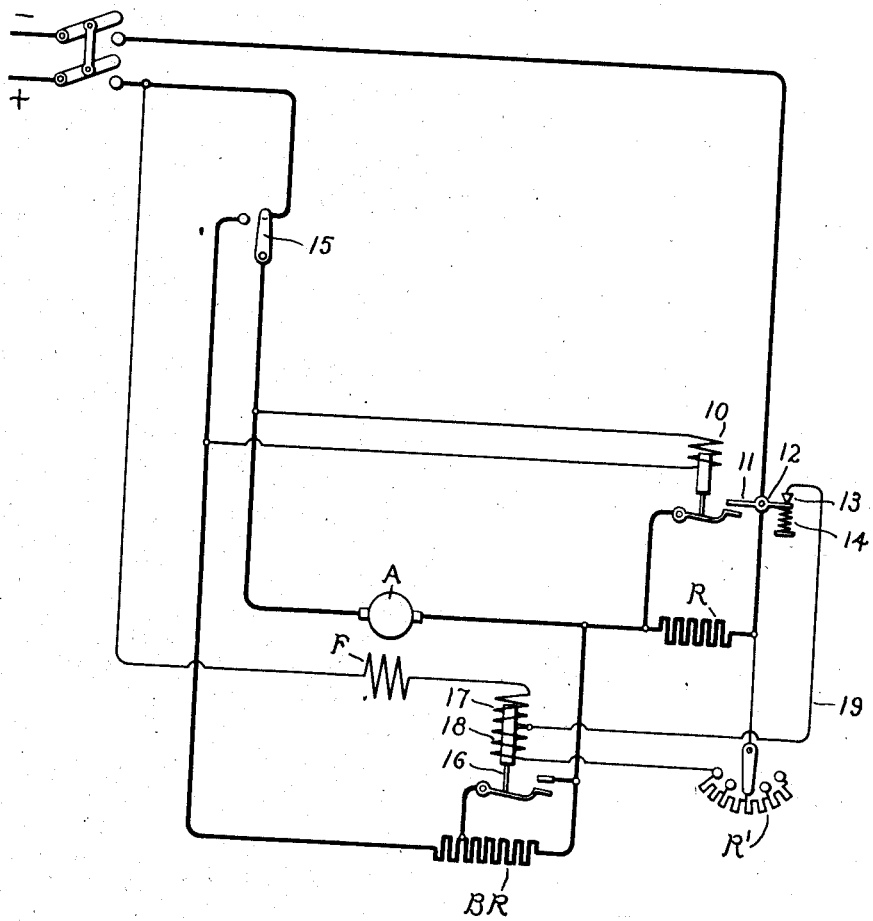

UNITED STATES PATENT OFFICE.

JOHN EATON, OF SCHENECTADY, NEW YORK, ASSIGNOR TO GENERAL ELECTRIC COMPANY, A CORPORATION OF NEW YORK.

MOTOR-CONTROL SYSTEM.

1,045,959.  Specification of Letters Patent.  Patented Dec. 3, 1912.

Application filed June 13, 1912. Serial No. 703,454.

*To all whom it may concern:*

Be it known that I, JOHN EATON, a subject of the King of Great Britain, residing at Schenectady, county of Schenectady, State of New York, have invented certain new and useful Improvements in Motor-Control Systems, of which the following is a specification.

This invention relates to the control of electric motors and has for its object the provision of means whereby an electric motor may be started, stopped and generally controlled in a reliable and efficient manner.

My invention relates more specifically to the control of motors by what is known as dynamic braking so as to bring them to rest quickly and safely.

In the control of electric motors it is frequently desirable to bring the motor armature to rest quickly at a time when the field of the motor is relatively weak. This is frequently true of motors which must be quickly reversed, as, for instance, in the case of electrically driven planers and the like, although this condition is quite as apt to arise in connection with non-reversible motors. It has been found that if the motor is stopped or retarded by dynamic braking under this condition of weakened field, sparking at the commutator will result if the braking current is permitted to become too high. While it is customary to cut out the field resistance at the time the dynamic brake is applied, the field does not reach full strength immediately owing to the inductive effect of the field circuit. It has been found that if the dynamic braking current is permitted to increase only as the field strength builds up that sparking at the commutator can be avoided.

In an application of John E. Brobst, Serial No. 692,957, filed April 24, 1912, and assigned to the same assignee as the present application, there is described and claimed means whereby the dynamic braking current is controlled or graduated to the strength of the field. In the particular arrangement disclosed therein a relay is provided which operates when a predetermined field strength is reached to effect the necessary change in connections to increase the dynamic braking current. In carrying out my invention I provide improved means for bringing about this result. This improvement consists broadly in providing the electromagnetic switch or relay which changes the dynamic braking conditions with two windings which when energized render the relay inoperative. When it is desired to apply the dynamic brake one of these windings is short circuited simultaneously with the short circuiting of the field resistance and the circuit connections are so arranged that the relay will be rendered operative and dependent for its actuation only upon the field strength. When, therefore, the field current has reached a predetermined value at which the dynamic braking current can be safely increased, the relay operates to bring about the increase of current in the armature circuit up to the limit of commutation of the motor. There are two well known methods of dynamic braking, one of which involves the returning of energy to the line or what is familiarly known as "pumping back" onto the line, while the other involves disconnecting the motor armature from the line and short circuiting it through a resistance. In this particular instance I have illustrated my invention in connection with the latter method of braking but my invention is in no sense limited as to the type or method of braking employed.

In the accompanying drawing illustrating one form of my invention in a diagrammatic way, A represents the armature of the motor to be controlled and F the shunt field. R represents a starting resistance for bringing the motor up to running speed and R' represents an adjustable resistance arranged to be connected in the shunt field of the motor after the starting resistance has been short circuited. The starting resistance may be cut out in any well known manner, as for instance, by means of a contactor 10 which for purposes of illustration I have shown as being connected so as to operate when the counterelectromotive force of the motor reaches a predetermined value. The field resistance R', which is normally short circuited, is arranged to be inserted in the motor field upon the closing of the contactor 10. This may be accomplished in any desired way, but for purposes of illustration I have shown the contact 11 cooperating with the movable contact of the contactor 10 pivoted at 12 and normally pressed into engagement with contact 13 by a spring 14. When the contactor 10 closes, the short circuit on the resistance R' will be opened at the contact 13. BR represents the dynamic brake resistance for bringing the motor quickly to rest. This resistance, which is of any suitable value, is arranged to be connected in a short circuit with the motor armature when the switch 15 is moved to off position. For controlling this brake resistance I have provided a relay 16 having two differential or opposing windings 17 and 18. These two windings are connected in series with the shunt field F and with the resistance R'. The intermediate point of the windings is connected with the contact 13 by a conductor 19. It is obvious that when the circuit through the conductor 19 is open at the contact 13 the two windings 17 and 18 will be energized in series with the field F and resistance R' and therefore will have no closing effect upon the contactor because they are wound differentially. When, however, the circuit is completed at contact 13 through the conductor 19 the lower winding 18 and the resistance R' will be short circuited leaving the winding 17 alone in circuit in series with the field.

The operation of my device as thus constructed and arranged is as follows: When the switch 15 is moved into starting position, which is the position shown in the drawing, and the line switch is closed, a circuit will be closed from the positive side of the line through the armature A, and resistance R, to the opposite side of the line. The circuit of the shunt field of the motor will be from the positive side of the line, through the field F, through the upper winding 17, conductor 19, and contact 13, to line. This causes the motor A to start with the field at full strength. The relay 16 will now operate but it will have no effect, since the braking circuit is not closed. As the motor comes up to speed, the counterelectromotive force contactor 10 will operate to short circuit the resistance R and at the same time by opening the circuit through conductor 19 at contact 13 will insert resistance R' in the field circuit to weaken the field and speed up the motor. The lower differential winding 18 is also connected in circuit so as to oppose the winding 17 and render the relay 16 inoperative. The circuit will now be from the positive side of the line, through the field F, through the two differential windings 17 and 18, thence through resistance R', the amount of which will depend upon the position of the controlling arm, to the negative side of the line. The motor will now reach a speed dependent upon the value of the resistance R'. To stop the motor the switch 15 is moved to off position, the effect of which is to connect the brake resistance BR in a short circuit through the armature and switch 15. The movement of the switch 15 likewise deënergizes the winding of contactor 10. The opening of this contactor 10 inserts the resistance R in the armature circuit so as to be in readiness for the next starting and likewise short circuits the resistance R' and winding 18, which are in series with the field, by permitting the circuit through the conductor 19 to be reëstablished at the contact 13. This short circuiting of the field resistance and winding 18 and the establishing of dynamic braking connections occur practically simultaneously so that the motor field is relatively weak when the braking circuit is closed, since it takes an appreciable interval for the field strength to build up. The relay 16 being open, however, dynamic braking takes place through the total brake resistance BR and therefore the braking current is relatively low. The braking resistance is so selected as to limit the braking current to such a value that there will be no sparking at the commutator with the weakened field. When the lower winding 18 of the differential relay is short circuited the operation of the relay 16 becomes dependent entirely upon the strength of the field. It will be seen, therefore, that as soon as the field strength builds up to such a value as to sufficiently energize the winding 17, relay 16 will close and short circuit a portion of the braking resistance. This will increase the braking current and increase the braking torque upon the motor. The field being strong, however, this increase of braking current may be generated without affecting the commutation of the motor. It will be understood, of course, that the amount of braking resistance which is cut out by the operation of the relay will depend altogether upon the conditions and that any desired portion of the resistance may be cut out or even in some cases all of it, depending upon the design of the apparatus and how quickly the motor is to be stopped. By my arrangement the braking current will be automatically increased as the field strength builds up in an effective and simple manner, since the differential arrangement will have the effect of instantaneously energizing and deënergizing the relay and the connections are such that interlocking contacts are dispensed with.

While I have described my invention as embodied in concrete form and as operating in a specific manner for purposes of illustration, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. The combination with an electric motor, of a resistance for the field circuit thereof, a controlling switch, means for causing said motor to act as a generator to generate a dynamic braking current to retard the motor armature when the switch is operated, an electromagnetic switch for controlling the braking current having differential actuating windings connected in series with the motor field and said resistance, and means for simultaneously short circuiting the field resistance and one of said actuating windings so as to permit the electromagnetic switch to operate on a sufficient current flow.

2. The combination with an electric motor, of a resistance for the field circuit thereof, a controlling switch, means for causing said motor to act as a generator to generate a braking current which is relatively low to retard the motor armature when the switch is operated, an electromagnetic switch for controlling the braking current having differential actuating windings connected in series with the motor field and said resistance, and means for simultaneously short circuiting the field resistance and one of said actuating windings to permit the electromagnetic switch to operate upon a sufficient current flow to increase the braking current.

3. The combination with an electric motor and a braking resistance therefor arranged to be connected in a short circuit with the motor armature to retard the same, of a resistance for the field circuit of said motor, an electromagnetic switch for short circuiting a section of said braking resistance provided with two windings which when energized render the switch inoperative, and means for simultaneously short circuiting the field resistance and one of said windings to permit said switch to operate upon a sufficient current flow.

4. The combination with an electric motor and a braking resistance therefor arranged to be connected in a short circuit with the motor armature to retard the same, of a resistance for the field circuit of said motor, an electromagnetic switch having differential actuating windings connected in series with the motor field for short circuiting a section of said brake resistance, and means for simultaneously short circuiting the field resistance and one of said differential windings to permit said electromagnetic switch to operate upon a sufficient current flow.

5. The combination with an electric motor and a braking resistance therefor, of a controlling switch arranged to connect said resistance in a short circuit with the motor armature to retard the same, a resistance for the field of said motor, an electromagnetic switch having differential actuating windings connected in series with the motor field and said resistance for short circuiting a section of said brake resistance, and connections whereby the field resistance and one of said differential windings are simultaneously short circuited upon the operation of the controlling switch.

6. The combination with an electric motor and a braking resistance therefor arranged to be connected in a short circuit with the motor armature to retard the same, of a resistance for the field circuit of said motor, an electromagnetic switch having differential actuating windings connected in series with the motor field and said resistance for short circuiting a section of said brake resistance, and means for simultaneously short circuiting the field resistance and one of said differential windings to permit said electromagnetic switch to operate upon a sufficient current flow.

7. The combination with an electric motor and a braking resistance therefor arranged to be connected in a short circuit with the motor armature to retard the same, of a resistance for the field circuit of the motor, an electromagnetic switch having differential actuating windings connected in series with the motor field and field resistance for short circuiting a section of said brake resistance, a conductor connected with the intermediate point of said actuating windings for short circuiting one of said windings and the field resistance, and an electromagnetic switch for controlling the circuit through said short circuiting conductor.

8. The combination with an electric motor and a starting resistance therefor, of a switch for short circuiting the said resistance to accelerate the motor, a braking resistance arranged to be connected in a short circuit with the motor armature to retard the same, a resistance for the field of the motor, an electromagnetic switch having differential windings connected in series with the motor field and field resistance for short circuiting a section of said brake resistance, a conductor connected with the intermediate point of said actuating windings for short circuiting one of said windings and the field resistance, the circuit through said conductor being controlled by the operation of the accelerating switch.

9. The combination with an electric motor and a starting resistance therefor, of a switch for short circuiting the said resistance to accelerate the motor, a braking resistance arranged to be connected in a short circuit with the motor armature to retard the same, a resistance for the field circuit of the motor, an electromagnetic switch having differential actuating windings connected in series with the motor field and said resistance for short circuiting a section of said brake resistance, and means whereby the field resistance and one of the differential windings are short circuited upon the opening of the accelerating switch to permit said electromagnetic switch to operate upon a sufficient current flow.

In witness whereof, I have hereunto set my hand this 11th day of June, 1912.

JOHN EATON.

Witnesses:
 BENJAMIN B. HULL,
 HELEN ORFORD.